United States Patent

Runtze et al.

(12) 
(10) Patent No.: US 6,583,814 B1
(45) Date of Patent: Jun. 24, 2003

(54) SYSTEM FOR CORRECTION OF CONVERGENCE IN A TELEVISION DEVICE RELATED APPLICATION

(75) Inventors: Albert Runtze, Villingen (DE); Fredrich Heizmann, Villingen (DE); Günter Gleim, Villingen (DE); John Barrett George, Carmel, IN (US)

(73) Assignee: Thomson Licensing SA, Boulogne Cedex (FR)

( * ) Notice: Subject to any disclaimer, the term of this patent is extended or adjusted under 35 U.S.C. 154(b) by 0 days.

(21) Appl. No.: 09/408,928

(22) Filed: Sep. 30, 1999

Related U.S. Application Data

(63) Continuation-in-part of application No. 09/133,607, filed on Aug. 13, 1998.

(30) Foreign Application Priority Data

Aug. 19, 1997 (DE) .......................................... 197 35 681

(51) Int. Cl.[7] .......................... H04N 17/00; H04N 17/02
(52) U.S. Cl. ...................... 348/189; 348/807; 348/181
(58) Field of Search ................................. 348/745–747, 348/806, 807, 177, 189, 190, 180, 181, 569, 805; 315/368.11; 345/157; H04N 17/00, 17/02

(56) References Cited

U.S. PATENT DOCUMENTS

| | | | |
|---|---|---|---|
| 4,816,908 A | * | 3/1989 | Colineau et al. ............ 315/368 |
| 5,214,499 A | | 5/1993 | Gleim et al. |
| 5,235,173 A | | 8/1993 | Gleim et al. |
| 5,260,785 A | * | 11/1993 | Gleim et al. ................ 348/180 |
| 5,966,124 A | * | 10/1999 | Devine ....................... 348/339 |

FOREIGN PATENT DOCUMENTS

JP 362061495 * 3/1987 .......... H04N/17/04

* cited by examiner

*Primary Examiner*—Michael H. Lee
(74) *Attorney, Agent, or Firm*—Joseph S. Tripoli; Harvey D. Fried; Joseph J. Kolodka

(57) ABSTRACT

For control and correction of deflection parameters especially of convergence, a grid pattern is displayed on the picture screen of a television device. For control of the convergence parameters and the evaluation of the correction values the crossing points of the grid pattern are marked by a cursor. The cursor is formed by at least one irregularity in the grid pattern being, regular otherwise. The irregularity may consist in an omission within the grid pattern like an interruption within one horizontal or vertical grid line. An image signal generator for the grid pattern with position cursor includes a raster generator, a grid generator, a cursor generator, and means for combining a grid signal from the grid generator and a cursor signal from the cursor generator so as to inhibit the grid signal corresponding to locations on the grid pattern where the position cursor is visible by an absence of display of portions of the grid pattern.

15 Claims, 4 Drawing Sheets

SYSTEM FOR CORRECTION OF CONVERGENCE IN A TELEVISION DEVICE RELATED APPLICATION

This invention is a continuation-in-part of previously filed application Ser. No. 09/133,607, entitled "System For Correction Of Convergence In A Television Device", filed Aug. 13, 1998 in the name of inventors Gunter Gleim and Albert Runtze, also inventors in this application.

BACKGROUND OF THE INVENTION

The invention relates to digital convergence or raster correction on the screen of a television receiver, particularly a projection television, and more particularly to an indicator or cursor for locating a position for manual adjustment of digital convergence.

Raster correction is generally used for the adjustment of parameters such as screen deflection, north-south of, or east-west distortions, pincusion distortions, non-linearity of deflection and other picture geometry faults in the horizontal and vertical directions. A particular field of application is convergence adjustment with a projection television receiver in which three monochromatic pictures are projected onto a screen by three picture tubes, one for each of the three primary colors. It is to be understood that as used herein a television receiver means any type of device having an electronic screen (raster) mode of picture reproduction. The device can be fed with a television broadcast signal or also purely as a monitor controlled by a RGB signal, a CSCC signal or separately with the luminance signal and color sub-carrier of any video signal source.

It is known in the art that a grid pattern of horizontal and vertical white lines is displayed on the screen forming a number of crossing points uniformly distributed over the screen. A certain crossing point of the raster design can be marked with a faded-in cursor and a particular deflection parameter of a selected point of the picture can be evaluated and a correction value for the point can be determined. The cursor fulfills two functions. The first function is the marking of the position of the portion of the picture for which the correction is required. The second function indicates whether or not correction is necessary and the extent of the correction needed.

In the prior art cross-shaped cursors are known. During convergence correction these cursors are set to a crossing point of the lines in such a manner that the cursor becomes coincident with the horizontal and vertical lines. In order that the cursor can be distinguished from the lines of the pattern it is known by JP-A 55 16 3980 to render the brightness of the cursor different from the brightness of the grid pattern. A further approach causes the cursor to become blinking. However all these solutions suffer from considerable drawbacks.

It has become evident that with a cursor with a brightness higher than the grid pattern a lack of definition can occur by defocussing; the cursor can even effloresce whereby the exact adjustment of the convergence is made difficult by the view of the cursor.

In order to avoid the above drawbacks it was proposed in U.S. Pat. No. 5,214,499 to use a cursor having a brightness inferior to the brightness of the grid pattern. This solution ensures that the presentation sharpness for the cursor on the screen is sufficient and that the adjustment of the convergence by view to the cursor can be performed with high accuracy.

In case the adjustment of convergence has to be performed automatically by means of a video camera it should be ensured that the brightness of the cursor and the brightness of the grid pattern differ by a factor of about 2. In connection with the last-mentioned solution it is necessary therefore to present the grid pattern with a very high brightness. This represents a heavy load for the high voltage supply sources for the individual picture tubes to a greater extent than during normal operation of the television device. As the adjustment of convergence is dependent also on the loading of the high voltage source it is impossible to achieve in this manner a convergence adjustment being optimal for normal operation.

When using a blinking cursor the periodic change between ON and OFF of the cursor is felt unpleasant during adjustment of convergence. With an automatic adjustment of convergence by means of a camera the camera has to be synchronized to the blinking of the cursor whereby hardware becomes more complex. A blinking cursor or a cursor with temporarily varying brightness therefore is not suitable for practical purposes.

Furthermore it is possible principally to present the cursor with a color different from the color of the grid pattern which normally is represented in pure white color. With a grid pattern in pure white color a faulty convergence adjustment is noticeable by colored edges which however can be noticed best at a pure-white cursor.

In a digital convergence system convergence values are determined for each display color and applied at an array of points located at intersections of an alignment grid superimposed, for example, on a black background. Alternatively, the background can be gray or shaded. In a manual digital convergence system a user may manually adjust deflection parameters at the grid intersections, in either or both horizontal and vertical scan directions, to superimpose individual colored lines to form a white grid on the black background. These adjustment values are then stored for each grid intersection and subsequently read out to provide a converged display image. During the convergence adjustment process the alignment grid display must be stable and free from transient geometric distortions, for example, resulting from instability of deflection fields forming the scanned raster, or raster size variation due to power supply loading effects causing the cathode ray tube (CRT) ultor or high voltage supply to vary.

In a CRT display, image brightness is directly related to the scanning beam current, where the darkest area represents the smallest current and the brightest area represents the greatest beam current. Thus it may be appreciated that the beam current varies dynamically at video frequency rates. It is well known that a scanned raster size is inversely proportional to the square root of the high voltage or EHT applied to the wall anode of the CRT. Hence, if the high voltage supply exhibits poor voltage regulation with beam current variation, the high voltage value will vary in response to the displayed image brightness, typically dropping with increasing beam current. As a result, the scanned raster size will vary, particularly in the area of any high brightness image content. It may further be appreciated that brightness modulation of the raster size is undesirable not only during normal image display, but also during convergence alignment where brightness modulation results in convergence errors.

SUMMARY OF THE INVENTION

In accordance with inventive arrangements a system for adjustment of convergence is provided enabling an optimal adjustment of convergence and also enabling the automatic implementation of adjustment of convergence. The cursor advantageously is formed by at least one irregularity of the grid pattern.

Automatic systems for picking up pictures require high differences in brightness between the individual objects for ensuring satisfactory operation. Contrary to this, however, irregularities within a pattern having no irregularities otherwise and having a brightness being variable within far limits are very easily noticeable by automatic systems for picking up pictures. Applying this recognition to the convergence correction in a television device yields the advantage that the brightness of the indispensable grid pattern can be adjusted in such a manner that the high voltage source is loaded only in such an extent which is typical for normal operation. In this way one of the important conditions for achieving optimal adjustment of convergence within normal operation mode is fulfilled.

According to one embodiment of the inventive arrangements the irregularity within the grid pattern is formed by an additionally represented element, e.g. by an additional line. The irregularity however can also be formed by omitting a portion of the grid pattern. This can be achieved for example by providing interruptions within one of the lines forming the grid pattern. In case only a single irregularity is provided within the grid pattern the position of the cursor is defined by the position of the irregularity with respect to the nearest positioned grid point. The definition of the position of the cursor can be simplified by providing not only one irregularity within the grid pattern but by providing several irregularities. The most simple determination of the position can be achieved if the considered crossing point of the grid pattern is surrounded by four irregularities. In this embodiment irregularities means that means interruptions of the grid lines or additionally displayed elements.

According to a modification of the invention any marks or elements displayed on the screen and forming the cursor are apart or separated from the cursor in such a way that they do not touch the area of the observed crossing point. Thereby the cursor does unambiguously identify the observed crossing point but advantageously does in no way affect the crossing point. Especially the cursor does not vary parameters like brightness, diameter, color or shape of the crossing point so that adjustment of convergence by viewing the crossing point is not made difficult or deteriorated by the cursor temporarily marking the crossing point.

According to another aspect of the inventive arrangements there is provided an image signal generator for an alignment grid indicating convergence of a color image display and position cursor on the alignment grid, the image signal generator comprising: a raster generator providing a scanned raster for a color image display; a grid generator for providing a grid signal corresponding to an alignment grid synchronized with the scanned raster and having intersections indicative of display locations for a manual adjustment of convergence; a cursor generator for providing a cursor signal synchronized with the grid signal and indicative of where on the alignment grid the position cursor is to be visible, the cursor signal interrupting the grid signal at the cursor position.

According to a further aspect of the invention there is provided a method for displaying a cursor on a convergence alignment grid, comprising the steps of:

displaying on a raster an alignment grid image defined by a grid signal; and, preventing propagation of the grid signal at selected positions of the alignment grid image, an absence of the alignment grid image at any one of the selected positions defining a cursor image, whereby the alignment grid image and average beam current generated during the displaying step is substantially unaffected by the cursor image.

DETAILED DESCRIPTION OF THE PREFERRED EMBODIMENTS

Figure 1:
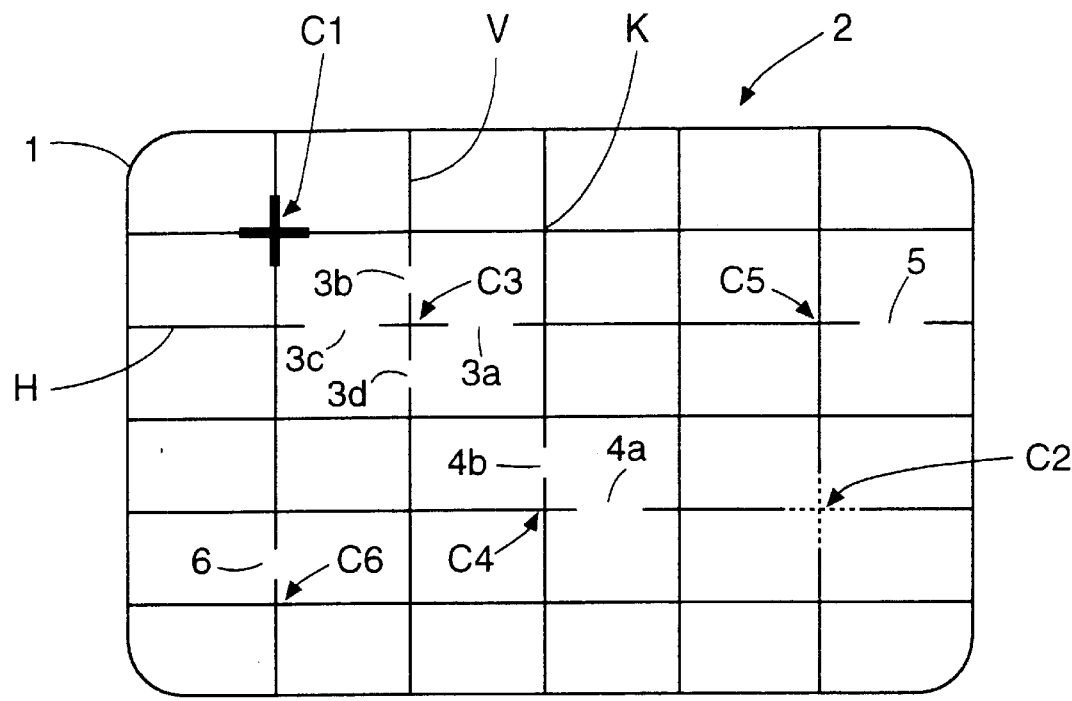
FIG. 1 shows a grid pattern with cursors according to prior art having a brightness differing from the brightness of the grid pattern as well as cursors according to the invention being formed by interruptions within the grid pattern and FIG. 2 shows a grid pattern together with cursors according to the invention being formed by displaying additional elements.

FIG. 1 shows in schematic form the projection area 2 being limited by a border 1 as being used for a projection television device. By means of three monochromatic picture tubes for the primary colors red, green and blue a grid pattern with bright horizontal and vertical lines H, V is displayed on said area. The lines H and V are of the same width the horizontal lines H having approximately the width of one television line. The lines H and V intersect each other at crossing points K a cursor C being movable along both directions between said crossing points. Within the left upper portion of the area of FIG. 1 a cross-shaped cursor C1 is shown having horizontal and vertical legs coinciding with a horizontal and vertical line of the grid pattern, respectively. In order that the cursor can be recognized by the user its brightness is chosen higher than the brightness of the grid lines. In the figure this is indicated by broad short lines forming the four legs of the cursor C1.

Within the right part at the bottom of the area of FIG. 1 a further cross-shaped cursor C2 is shown having a brightness which is inferior the brightness of the grid lines in order to make the cursor recognizable on the grid pattern. The lower brightness of the cursor C2 relative to the grid pattern is indicated by the broken lines. These two sorts of cursors are known by prior art and yield the above-mentioned drawbacks in connection with the correction of convergence.

FIG. 1 shows a cursor C3 according to the invention having a brightness not differing from the brightness of the grid pattern. Instead of this the cursor C3 is defined by irregularities 3a . . . 3d. In the case shown in the figure the irregularities are formed by interruptions of the respective horizontal line H and the vertical line V coinciding with vertical and horizontal legs of the cursor. In this way the cursor forms a cross which is isolated from the remaining grid pattern. For a further cursor C4 according to the invention only a single interruption 4a and 4b, respectively, of a horizontal line H and a vertical line V, respectively, is provided. In connection with an accommodated picture recognition algorithm said two interruptions 4a, 4b of the lines are sufficient for unambiguously determining the actual position of the cursor C4. In extreme case a single interruption of a horizontal line or of a vertical line V, as shown by the cursors C5 and C6 as wall as by the interruptions 5, 6 in the figure, will be sufficient. In the last-mentioned case the rule might be for example that in each case the nearest positioned crossing point K in a given direction has to be considered for correction of convergence.

Figure 2:
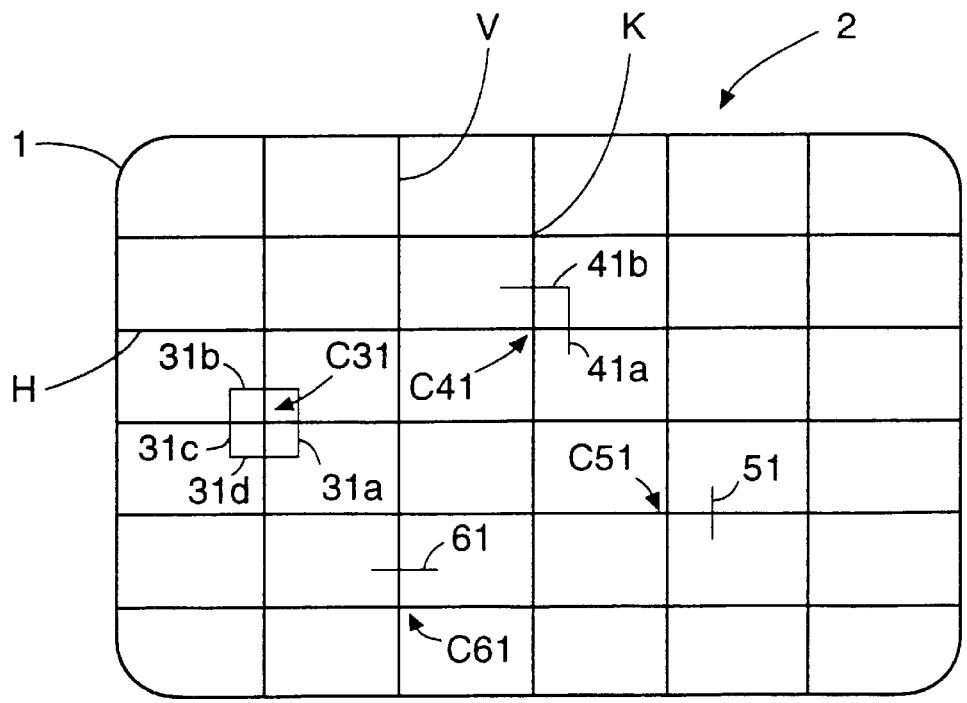

FIG. 2 shows four further cursors according to the invention. Therein, contrary to FIG. 1, the irregularities within the grid pattern are produced by an additionally represented element. In the present case a short line is selected for this purpose. However, also other geometric elements can be used. For a cursor C31 the crossing point marked by this cursor is surrounded both on the horizontal line H and the vertical line V by two lines 31a . . . 31d. For a further cursor C41 only two lines 41a, 41b are provided whereas for further cursors C51 and C61 only a single additional line 51 and 61 respectively is provided.

During correction of convergence the respective selected cursor is moved incrementally from one crossing point to the next for performing the correction of convergence. This can be done manually or automatically.

Instead of the described grid pattern formed by horizontal and vertical lines H, V patterns of other forms can be used. It is also possible to represent on the picture area two horizontal and vertical lines one after the other, to represent instead of the crossing points K only crosses with a single horizontal leg and a single vertical leg, to produce diagonal lines on the picture area or to mark defined points or portions of the picture area in any other way which can be approached by the cursor C for determining the correction values for the deflection parameters.

Figure 3:
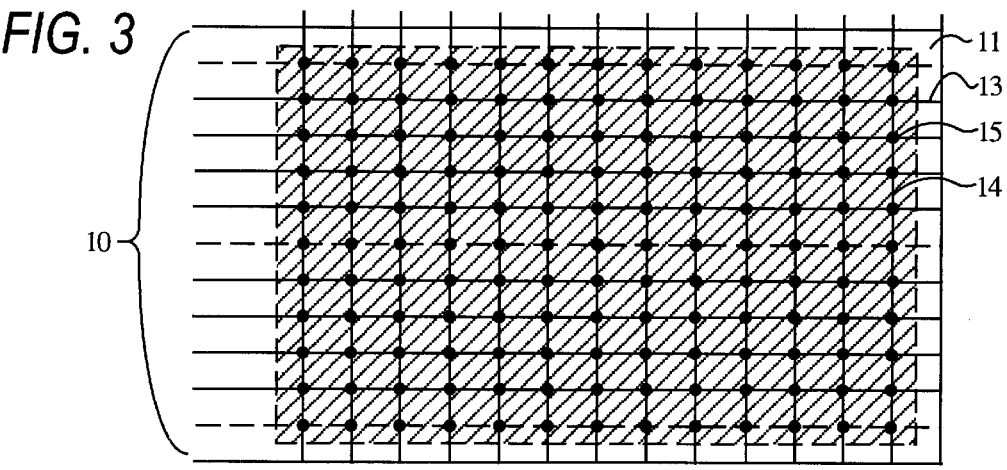
FIG. 3 illustrates an exemplary screen display with grid superimposed on a background.

FIG. 3 illustrates an exemplary grid, i.e., alignment grid, superimposed on a background of a display screen 11. For illustration purposes the grid is shown to be black against a white screen background 11. In actual practice the grid is bright or white, resulting from a convergence of red, green and blue (R, G and B) grid scanning lines, and the screen display background is dark from lack of illumination. The grid consisting of horizontal and vertical lines 13, 14 is produced by selectively illuminating a matrix array of R, G and B picture elements (pixels) 15 in the raster scanning lines.

Figure 4:
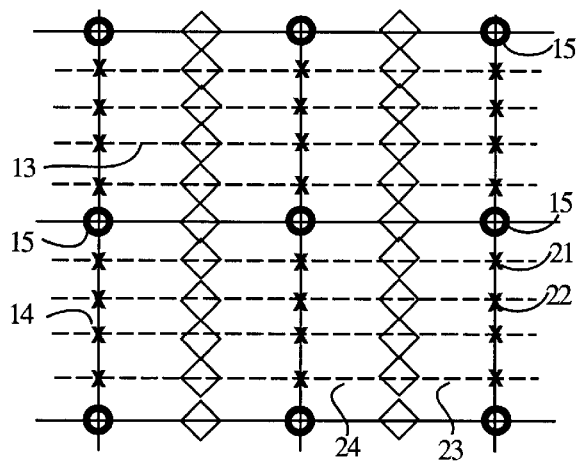
FIG. 4 illustrates a portion of the grid of FIG. 1 in greater detail.

The raster scanning lines include R, G and B pixels for displaying image content brightness that are greater in number than necessary for generating the grid. Referring to FIG. 4, interposed between the grid intersections 15 are vertical R, G and B pixel groups and horizontal R, G and B pixel groups. The G or green pixels are typically chosen to be centered on the display axis. In this position, the image made up of the G pixels has the least geometric distortion on the display screen. The R or red and B or blue pixels are typically off the axis horizontally, but on the display axis vertically. Because the optical distortion is minimum for the image composed of G pixels it is chosen as the geometric reference. The images composed of the R and B pixels are then matched to align precisely with the image composed of the G pixels.

In practice each of the horizontal and vertical grid lines between grid intersections 15 includes more R, G and B pixels available for displaying image brightness than the number of pixels shown in FIG. 4. The number of pixels between grid intersections have been reduced from their actual number in FIG. 4 for clarity in illustrating the grid structure. In the exemplary grid there are thirteen horizontal grid lines 13 and sixteen vertical grid lines 14, and interposed horizontally between each of the vertical grid lines 14 are sixteen groups of R, G and B pixels and interposed vertically between each of the horizontal grid lines 13 are sixteen groups of R, G and B pixels.

The grid line intersections 15 for the exemplary grid represent convergence locations available for manual adjustment by a technician or user. Manual convergence adjustment of each group of R, G and B pixels is possible, but impractical because the exemplary grid 16 horizontal grid lines at 16 R, G and B pixel convergence locations per horizontal grid line and 16 vertical grid lines at 16 R, G and B pixel convergence locations per vertical grid line would result in a grid with 65,536 intersections, far too many manual convergence adjustment locations to be of any practical benefit to a user.

Adjustment of convergence at a particular grid intersection 15 will have an impact on the convergence of pixels proximal to the grid intersection adjusted. The effects of a convergence adjustment at a particular grid intersection 15 on nearby grid intersections and pixels between the grid intersections can be ascertained through linear interpolation. Convergence impact on nearby pixel locations and grid intersections would be in proportion to a distance of the nearby pixel or grid intersection from the grid intersection where convergence is adjusted and the amount of vertical or horizontal adjustment at the grid intersection. In other words, convergence effects at pixel locations or grid intersections near a grid intersection where convergence is manually adjusted will be greater than convergence alteration at pixel locations or grid intersections farther from the grid intersection where convergence is manually adjusted. This can be visually displayed on the grid by gradually decreasing displacement of the horizontal or vertical position of a grid line as distance along the grid line from the grid intersection where the manual adjustment is made increases.

As noted, the grid is used to assess the convergence of individual R, G and B pixels at each intersection 15 of the grid. In FIG. 3 the horizontal and vertical grid lines 13, 14 and their intersections 15 ideally indicate convergence of the R, G and B pixels at each intersection 15. However, illumination or brightness of images actually presented on the screen display 11 will vary about the screen display. For example, a center area of the screen display 11 can display images exhibiting greater brightness than a periphery area about the center area. As a consequence of equipment aging or physical location a technician or user may want to adjust the convergence of the R, G and B pixels at individual intersections on the grid by manually adjusting the horizontal or vertical position of the R and B pixels relative to G pixels at particular grid intersections 15.

Facilitating manual adjustment of convergence of R, G and B pixels at a particular grid intersection requires the provision of a visible position indicator for locating the grid intersection at which manual convergence adjustment will be effected. Known display position indicators include a cross hair "+" or "I" beam cursor. These cursors if centered on a grid intersection would obscure the grid lines near the grid intersection of interest. An alternative cursor would be a box outline cursor "□", depicted in FIG. 5, centered about a grid intersection 15. The box cursor 30 has the advantage of being centered about a grid intersection 15 without unduly obscuring grid lines meeting at the grid intersection where manual convergence adjustment is to be performed. However, the box cursor 30 is problematic in that image brightness from the box edges results in increased beam current which reduces the EHT and distorts the raster near the box cursor 30, thereby distorting grid line and intersection displacements displayed while manual convergence adjustments are made, as illustrated in FIG. 5.

As noted above, in practice the grid is formed by convergence of R, G and B pixels in the raster scanning lines producing a bright or white grid against a dark screen background. Likewise, the box cursor 30 is formed by a convergence of R, G and B pixels in the raster scanning lines to produce a white box cursor 30. The grid and box cursor 30 are shown to be black against a white background for illustration purposes only. The box cursor 30 is an added beam current load which, as has been explained, causes the scanned raster size to increase, thereby distorting the screen display of pixel alignments making up the grid and intersections 15.

Figure 5:
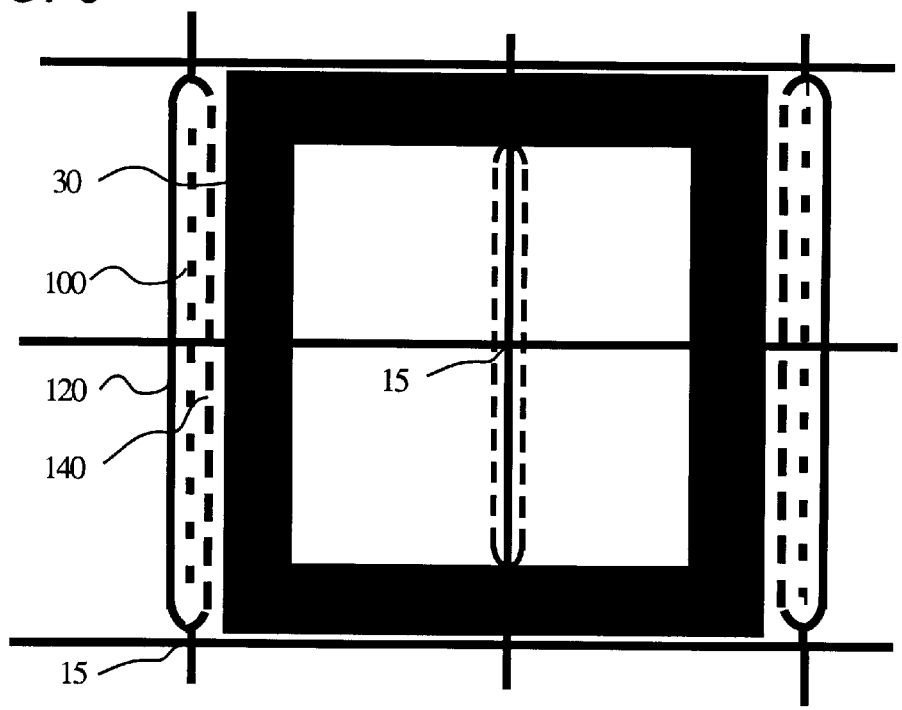
FIG. 5 illustrates raster distortion in the grid of FIG. 1 due to a position indicating cursor superimposed on the grid.

As shown in FIG. 5, the vertical grid lines to the left and right and in the center of the box cursor 30 illustrate the localized image distortion effects from the addition of light beam current load due to the box cursor 30. With the box cursor 30 present the left light vertical grid line appears displaced, for example, at position 120, while the center vertical grid line takes on the thickness of the phantom lines because of the influence from both the left and right sides of the box cursor 30. Typically, the user would manually adjust the left grid line to phantom line position 100. However, when the box cursor 30 is removed, the geometric image distortion due to cursor 30 is eliminated and the adjusted position at phantom line 100 shifts to the inner phantom line position 140. Also, when the box cursor 30 is removed the center grid line takes on the thickness of the solid line.

The change in high voltage causes a deflection size change due to the time that an electron is in the magnetic field. The change in high voltage cannot happen rapidly and takes several line periods due to the capacitance of the ultor or EHT circuit. In the vertical direction size change effects whole lines only and slightly modulates the entire picture size from top to bottom and scene to scene. Differential line to line size change due to slow HV changes are visible in the horizontal direction as width modulation This can be seen with a flashing block pattern as a width increase on high beam current lines.

Figure 6:
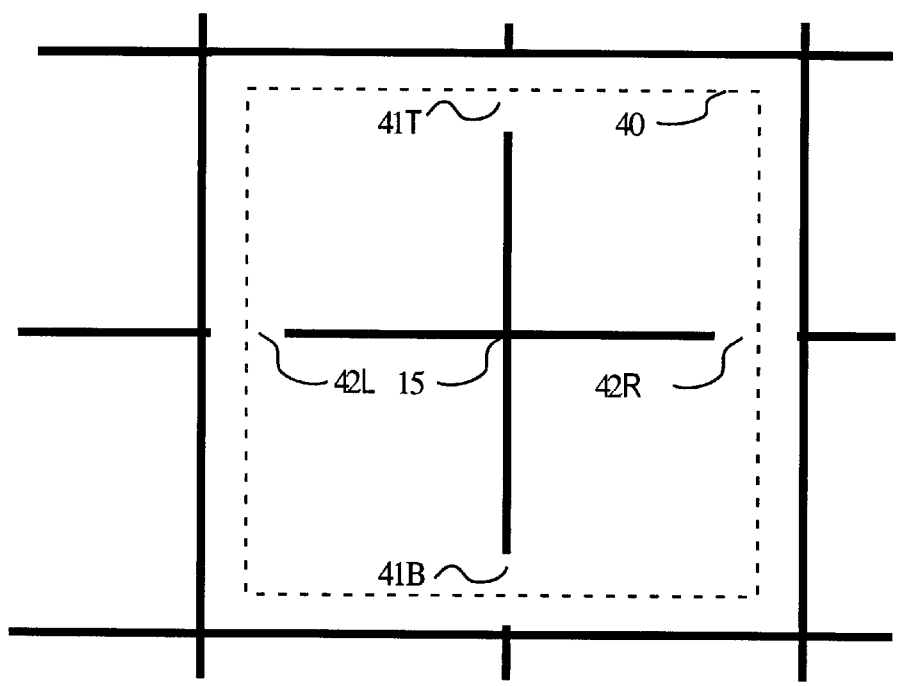
FIG. 6 illustrates an inventive position indicating cursor superimposed on the grid of FIG. 1.

The problem with geometric distortion of the raster resulting from beam current loading due to the box cursor 30 is eliminated by an inventive invisible cursor 40 shown in FIG. 6, or an invisible cursor of a cross hair "+" configuration (not shown). Rather than employing a solid perimeter band of brightness, as with the box cursor 30, the grid line portions or pixels coincident with positions where a banded box cursor would appear are advantageously blanked, inhibited or not illuminated. Profiling the center line of the invisible cursor 40 is a phantom line included for illustration purposes only which would not be displayed in practice as it too may introduce unwanted beam current loading with an attendant image distortion near the phantom line.

By blanking out the grid lines 41T, 41B, 42L and 42R, at locations coincident with the invisible cursor 40, variation in beam current loading between the full grid and gated or cursor blanked grid lines 41 and 42 is substantially unchanged. Therefore, a screen display of manual convergence adjustment at a grid intersection and linear interpolations of convergence adjustment in the grid lines leading from the grid intersection manually adjusted are unchanged by the absence or presence of the invisible cursor 40. Generally, when the grid and invisible cursor are displayed simultaneously the grid lines should be inhibited so as provide a visible break in the grid. In an exemplary embodiment, the grid lines are blanked within a range of ¼ of the grid line distance.

An alternate form of an inventive cursor is a partial box cursor such as a line segment next to the intersection to be indicated. In some instances, this line segment is easier to see than the invisible cursor which blends into the grid. If the indicator line is below the intersection, there is no width modulation of the line(s) that contain the intersection. The next line below that has intersections distant enough that the very small High Voltage width increase effect due to the indicator line has diminished. There are 4 off screen intersections that cannot be identified with the inventive invisible cursor. These can be identified with a line segment cursor. The line segment can be generated by illuminating pixels in a raster scan line between the horizontal grid lines shown in FIGS. 1 and 2. The line segment cursor can be made with a programmable lighted rectangle generator that is part of an auto-converge feature. The off screen corners can then be indicated by a line segment cursor.

Grid and cursor logic circuitry can provide for the invisible cursor 40 location to be initiated at a grid intersection in a center area of the grid. User controls can then position the invisible cursor 40 from grid intersection to grid intersection horizontally or vertically in grid intersection increments. With the invisible cursor 40 positioned about a particular grid intersection 15 user controls for adjustment of convergence of R, G and B pixels at the particular grid intersection would be operable. The screen display of the R, G and B pixels at the particular grid intersection would change in response to user manipulation changing convergence of the R, G, B pixel group, and convergence changes at nearby pixel groups would, preferably, be according to a linear relationship based on distance from the particular grid intersection and the manual vertical or horizontal displacement of the R and B pixels at the particular grid intersection.

Figure 7:
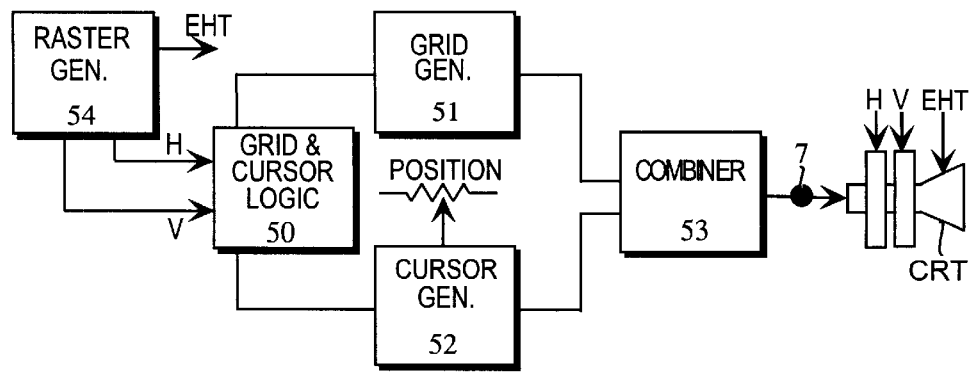
FIG. 7 is a block diagram for implementing the inventive position indicating cursor of FIG. 3.

Generation of a grid with grid lines blanked by the invisible cursor 40 can be implemented according to the block schematic of FIG. 7. Well known to skilled artisans, the raster generator 54 generates the horizontal H and vertical V signals for scanning of an exemplary raster. The horizontal H and vertical V scanning signals are fed to grid and cursor logic block 50, which provides features such as cursor position movement responsive to user controls, and alteration of R, G and B pixel alignments reflecting a user's direct convergence adjustment and linear interpolation adjustments of nearby pixels based on the user's direct convergence adjustment. The grid generator 51 provides a grid signal related to the desired grid configuration, such as number of grid intersections, and width and height in pixels of the grid lines. The cursor generator 52 provides a cursor signal related to the size and thickness of the invisible cursor and a "POSITION" of the cursor relative to a selected grid intersection. The "POSITION" can be provided with a viewer adjustable resistive type sensor with an output of a horizontal and vertical position signals. Circuitry or functions of the combiner block 53 effect a display of the inventive invisible cursor 40 in the grid by blanking or inhibiting illumination of pixels in the grid coincident with pixel locations corresponding to the invisible cursor 40, and pixels making up the grid lines outside the invisible cursor locations are illuminated. The display output signal 7 from the combiner block circuit 53 is coupled to a CRT that has deflection coils responsive to the H and V raster signals.

Figure 8:
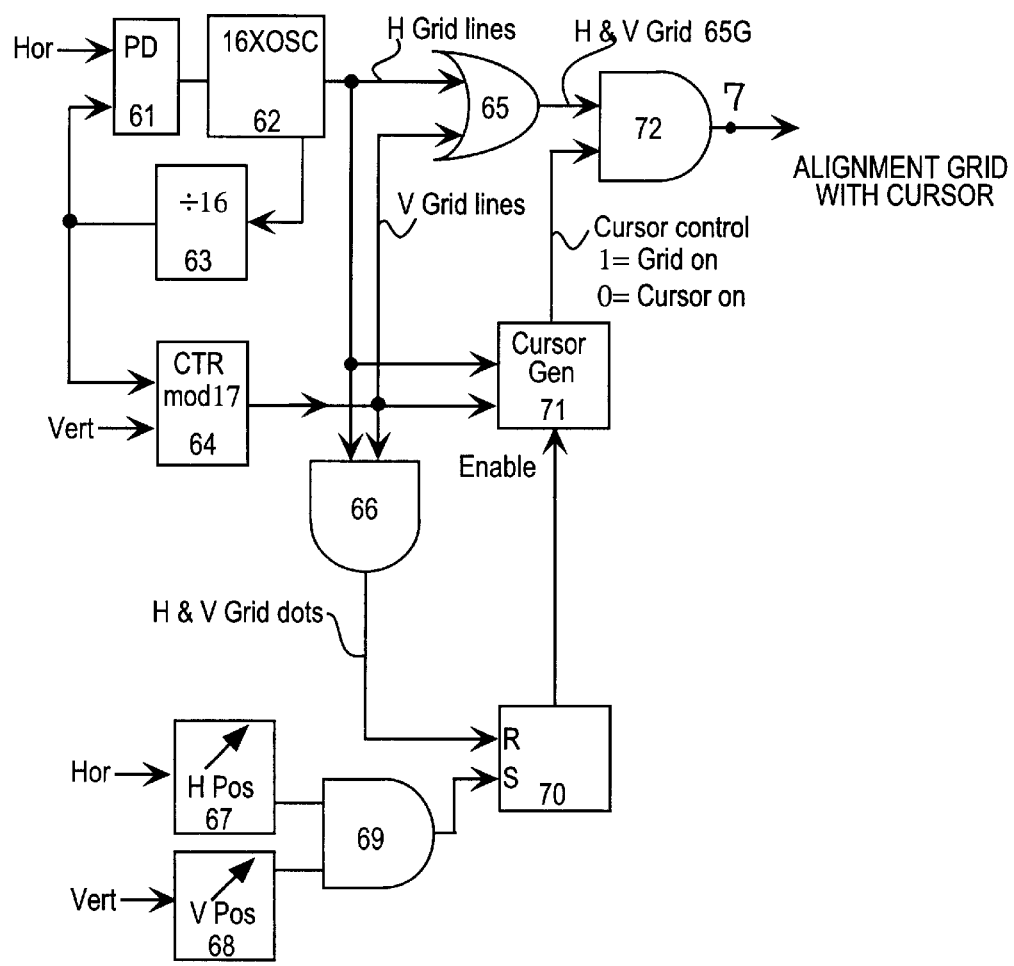
FIG. 8 is a schematic block diagram of an exemplary embodiment of a system for implementing the inventive position indicating cursor of FIG. 3.
Figure 9:
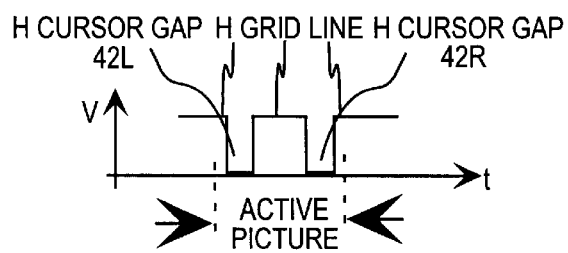
FIG. 9 is a signal waveform for the horizontal grid line of FIG. 4 including gaps 42L and 42R.

An exemplary signal output 7 from the combiner is shown in FIG. 9. Signal pulse references 42L and 42R can be correlated with the exemplary invisible cursor 40 of FIG. 6. The "ACTIVE PICTURE " portion of the signal correlates with the horizontal H grid line between the left 42L and right 42R gaps in the grid lines. Various analog and digital hardware and software configurations can be utilized for effecting the block configuration of FIG. 7, of which an exemplary configuration is detailed in FIG. 8.

Responsive to horizontal and vertical reset signals, Hor and Vert, a phase detector 61, oscillator 62, divider 63, and counter 64 cooperate to provide a horizontal grid line signal (H Grid Lines) and vertical grid line signal (V Grid lines) indicative of the number of horizontal grid lines between each horizontal scan line and the number of vertical grid lines. The horizontal H Grid lines and vertical V Grid lines are coupled to an OR gate 65 to produce a single signal (H & V Grid) 65G representing the alignment grid configuration. The Grid signal 65G is applied to AND gate 66 which outputs a logical 1 when the H Grid lines and V Grid lines are coincident, i.e., at the grid intersections. The horizontal H Grid lines and vertical V Grid lines are also coupled as inputs to a cursor generator 71.

Outputs from horizontal line position 67 and vertical line position 68 generators are horizontal and vertical position signals indicative of a user selected grid intersection and are coupled to an AND gate 69. The AND gate 69 outputs a logical 1, indicative of horizontal and vertical line pixel positions that are coincident, i.e., a grid intersection, to a set input S of latch, for example a flip flop. The latch 70 outputs to a cursor generator block 71 that determines pixel locations of the invisible cursor 40 relative to the user selected grid intersection via "Hor" and "Vert signals coupled to the horizontal and vertical line position detectors 67, 68. The flip flop 70 will be reset by the AND gate 66 output to check, only when the grid intersections occur, if the previously set or latched selected grid position is different. At a grid intersection the flip flop will be reset and if the coincident position signal out of gate 69 occurs at a different time the cursor generator 71 will account for the change. The cursor generator outputs a logical 1 when the grid line pixel is to be illuminated and a logical 0 when the grid line pixel is to be blanked.

Blanking of the grid lines by the invisible cursor's pixel positions is effected at the final AND gate 72 stage. In other words, propagation of the grid signal at selected positions on the grid, e.g., horizontal lines of the raster, coinciding with the cursor position is prevented. Absence of the alignment grid at any one of the selected positions defines the cursor image. Horizontal and vertical grid line positions are passed through the OR gate 65 to form the alignment grid which is then coupled to AND gate 72. The AND gate 72 advantageously generates the inventive cursor by means of an inhibition signal 65G when cursor generator 71 outputs a logical 0. When cursor generator 71 outputs a logical 1 grid signal 65G is enabled and passes for display. The signal output by the cursor generator 71 represents selected positions on the alignment grid that will define the cursor and acts as a control signal in permitting and preventing propagation of the grid signal output to the CRT or display device.

Variations, combinations and permutations of the above as would occur to those of ordinary skill in the art are included in the scope and spirit of the invention.

What is claimed is:

1. An image signal generator for an alignment grid indicating convergence of a color image display and position cursor on said alignment grid, said image signal generator comprising:

a raster generator providing a scanned raster for a color image display;

a grid generator for providing a grid signal corresponding to an alignment grid synchronized with said scanned raster and having intersections indicative of display locations for a manual adjustment of convergence;

a cursor generator for providing a cursor signal synchronized with said grid signal and indicative of where on said alignment grid said position cursor is to be visible, said cursor signal interrupting said grid signal at a cursor position, wherein said cursor signal interrupting said grid signal results in an absence of display of portions of said alignment grid coinciding with said position cursor, and means for combining said grid signal and said cursor signal so as to inhibit said grid signal corresponding to where on said alignment grid said position cursor is to be visible by an absence of display of portions of said alignment grid and providing an image signal output, said means for combining including a gate controlled by said cursor signal for coupling said grid signal to an input of a display device when said grid signal does not coincide with said cursor signal indicative of said position cursor, when said cursor signal is indicative of said position cursor said gate circuit inhibiting said grid signal and providing to an input of said display device said image signal output.

2. The image signal of claim 1, wherein said gate circuit is an AND gate, said grid signal has either a logical one state or logical 0 state indicating a portion of a grid line forming part of said alignment grid and indicating a lack of a portion of said grid line, respectively, said cursor signal has either a logical 0 state or logical 1 state indicating a position on said alignment grid corresponding to said position cursor and not corresponding to said position cursor, respectively.

3. The image signal generator of claim 1, wherein said grid generator comprises a circuit for combining a horizontal grid line signal and a vertical grid line signal into said grid signal.

4. The image signal generator of claim 3, wherein said circuit is an OR gate and each of said horizontal and vertical grid line signals has either a logical 1 state indicative of a position on said alignment grid where said grid line is displayed and a logical 0 state indicative of a location on said alignment grid where said grid line is not displayed.

5. The image signal generator of claim 1, wherein said grid generator comprises a generator for a horizontal grid signal indicative of horizontal grid lines on said alignment grid and a vertical grid signal indicative of vertical grid lines on said alignment grid, and means for combining said horizontal grid and vertical grid signals into said grid signal.

6. An image signal generator for an alignment grid indicating convergence of a color image display and position cursor on said alignment grid, said image signal generator comprising:

a raster generator providing a scanned raster for a color image display;

a grid generator for providing a grid signal corresponding to an alignment grid synchronized with said scanned raster and having intersections indicative of display locations for a manual adjustment of convergence;

a cursor generator for providing a cursor signal synchronized with said grid signal and indicative of where on said alignment grid said position cursor is to be visible, said cursor signal interrupting said grid signal at a cursor position, wherein said cursor generator includes a cursor controller receiving horizontal and vertical grid signals indicative of horizontal and vertical grid lines, respectively, on said alignment grid, said cursor controller responsive to an enable signal generator for generating said cursor signal, said enable signal generator including a latch circuit with a reset input receiving an intersection signal indicative of intersections on said alignment grid and a set input coupled to an intersection position signal indicative of an intersection on said alignment grid for centering said position cursor.

7. The image signal generator of claim 6, wherein said cursor generator comprises an AND gate combining horizontal and vertical position signals indicative of horizontal and vertical locations of an intersection on said alignment grid selected by a viewer and providing said intersection position signal.

8. The image signal generator of claim 1, wherein said position cursor is cursor visible on said alignment grid as an absence of display of portions of grid lines centered about an intersection on said alignment grid.

9. The image signal generator of claim 1, wherein said position cursor is a line segment type cursor positionable with respect an intersection in said alignment grid.

10. A method for displaying a cursor on a convergence alignment grid, comprising the steps of:

displaying on a raster an alignment grid image defined by a grid signal; and preventing propagation of said grid signal at selected positions of said alignment grid image, an absence of said alignment grid image at any one of said selected positions defining a cursor image, said preventing including generating a control signal representative of said selected positions and combining said grid signal and said control signal to provide a composite image signal for use in said displaying step;

whereby said alignment grid image and average beam current generated during said displaying step is substantially unaffected by said cursor image.

11. The method of claim 10, wherein said displaying step comprises: generating said grid signal representative of said alignment grid image; and said selected positions are selected horizontal lines of said raster.

12. The method of claim 10, comprising the step of choosing said selected positions to coincide with intersections of said alignment grid image.

13. The method of claim 11, comprising the step of choosing said selected positions to coincide with intersections of said alignment grid image.

14. The method of claim 12, comprising the steps of:

moving said cursor image between said intersections; and, correcting convergence of said alignment grid image at said intersections.

15. The method of claim 13, comprising the steps of:

moving said cursor image between said intersections; and, correcting convergence of said alignment grid image at said intersections.

* * * * *